Nov. 26, 1968 Z. M. FARMER 3,413,410

COLOR TELEVISION SYSTEM WITH MEANS FOR REDUCING KINESCOPE MISREGISTRATION

Filed Feb. 4, 1966 2 Sheets-Sheet 1

INVENTOR
Zane M. Farmer

BY Brown & Mikulka and Richard L. Aitken
ATTORNEYS

INVENTOR
Zane M. Farmer

BY Brown & Mikulka and
Richard L. Aitken
ATTORNEYS

United States Patent Office 3,413,410

Patented Nov. 26, 1968

3,413,410

COLOR TELEVISION SYSTEM WITH MEANS FOR REDUCING KINESCOPE MISREGISTRATION

Zane M. Farmer, Arlington, Mass., assignor to Polaroid Corporation, Cambridge, Mass., a corporation of Delaware Filed Feb. 4, 1966, Ser. No. 525,218
14 Claims. (Cl. 178—5.4)

ABSTRACT OF THE DISCLOSURE

This specification discloses a color television receiver employing a picture tube of the penetration type, which produces images of different colors in response to different electron beam velocities. The velocity of the electron beam is cyclically varied to produce different colored images on the screen of the picture tube. The images produced by the different velocities are brought into registration by changing the amplitudes of the current waveforms applied to the deflection coils of the picture tube in synchronism with the switching of the electron beam velocities.

This invention relates to improvements in the electronic production of displays in color and more particularly to a color television receiver of the type in which different colors are produced in accelerating electrons to different velocities.

In color television receivers, in which different colors are produced by accelerating electrons to different velocities, the screen of the color picture tube may be formed in layers of light emissive materials, each of which produces a different color when excited by an impinging electron. The electrons are accelerated to different velocities which are selected so that the electrons will penetrate selectively to the different light emissive layers. The lowest velocity electrons will penetrate only to the innermost layer, nearest the cathode, and accordingly will excite only the innermost light emissive layer. The highest velocity electrons will penetrate through to the outermost layer so that all of the light emissive layers are excited. If there are three light emissive layers, then some of the electrons will be accelerated to a velocity to penetrate through the innermost layer to the middle layer but not through the middle layer so that only the innermost and middle layers are excited.

This penetration type of color television receiver is particularly useful in producing color displays which take advantage of the phenomenon that a multicolored scene can be perceived even though the objects in the scene are represented by different combinations of intensities of monochromatic and achromatic light. For example, a scene of multicolored objects can be perceived in full color even though the objects are represented in the scene by different intensity combinations of red and white light. This phenomenon is described in an article entitled "The Retinex" by Edwin H. Land in the June 1964 issue of American Scientist, pages 247 through 264.

Penetration type color television receivers which take advantage of this phenomenon of color perception may use picture tubes with two or more light emissive layers. Such a receiver using a picture tube with two layers is disclosed in the copending application Ser. No. 297,341, filed July 24, 1963 and owned by the assignee of this application. A system using a picture tube with three light emissive layers is disclosed in the copending application Ser. No. 437,675, filed Mar. 8, 1965 and owned by the assignee of this application.

In color television receivers of the penetrating type, a problem exists in that electrons accelerated to a higher velocity will be deflected a smaller amount in a given deflection field than electrons accelerated to a lower velocity. Accordingly, unless some compensation is provided the field scanned by the higher velocity electrons will be smaller than the field scanned by the lower velocity electrons and the image produced by the higher velocity electrons will not register with the image produced by the lower velocity electrons.

In accordance with the present invention, a single electron beam is switched between high and low velocities to produce different colored images on the screen of the television picture tube. The images produced by the high and low velocities are brought into registration by changing the amplitudes of the current waveforms applied to the deflection coils of the picture tube in synchronism with the switching of the electron beam between velocities. When the electron velocity is increased, the amplitudes of the current waveforms are increased; and when the electron velocity is decreased, the amplitudes of the current waveforms are decreased. Thus, when the electron beam is at a high velocity, the deflection field will be relatively stronger; and when the electron beam is at a low velocity, the deflection field will be relatively weaker. The magnitude of the change in the amplitudes of the current waveforms is selected so that the electron beam will be deflected the same amount when the electron beam is at a high velocity as when it is at a low velocity. Accordingly, the images produced by the high and low velocity electrons will register.

Accordingly, an object of the present invention is to provide an improved color television system.

Another object of the present invention is to provide an improved color television receiver of the type making use of a penetration type picture tube.

A further object of the present invention is to provide an improved system for compensating for the different deflections that the different velocity electrons receive in a color picture tube in which different colors are produced by accelerating the electron beam to different velocities.

A still further object of the present invention is to prevent misregistration of images in a display system in which the images are produced in a cathode ray tube by electrons accelerated to different velocities.

A still further object of the present invention is to prevent misregistration of different color images in a color television receiver making use of a picture tube of the penetration type.

Further objects and advantages of the present invention will become readily apparent as the following detailed description of the invention unfolds and when taken in conjunction with the drawings wherein.

Figure 1:
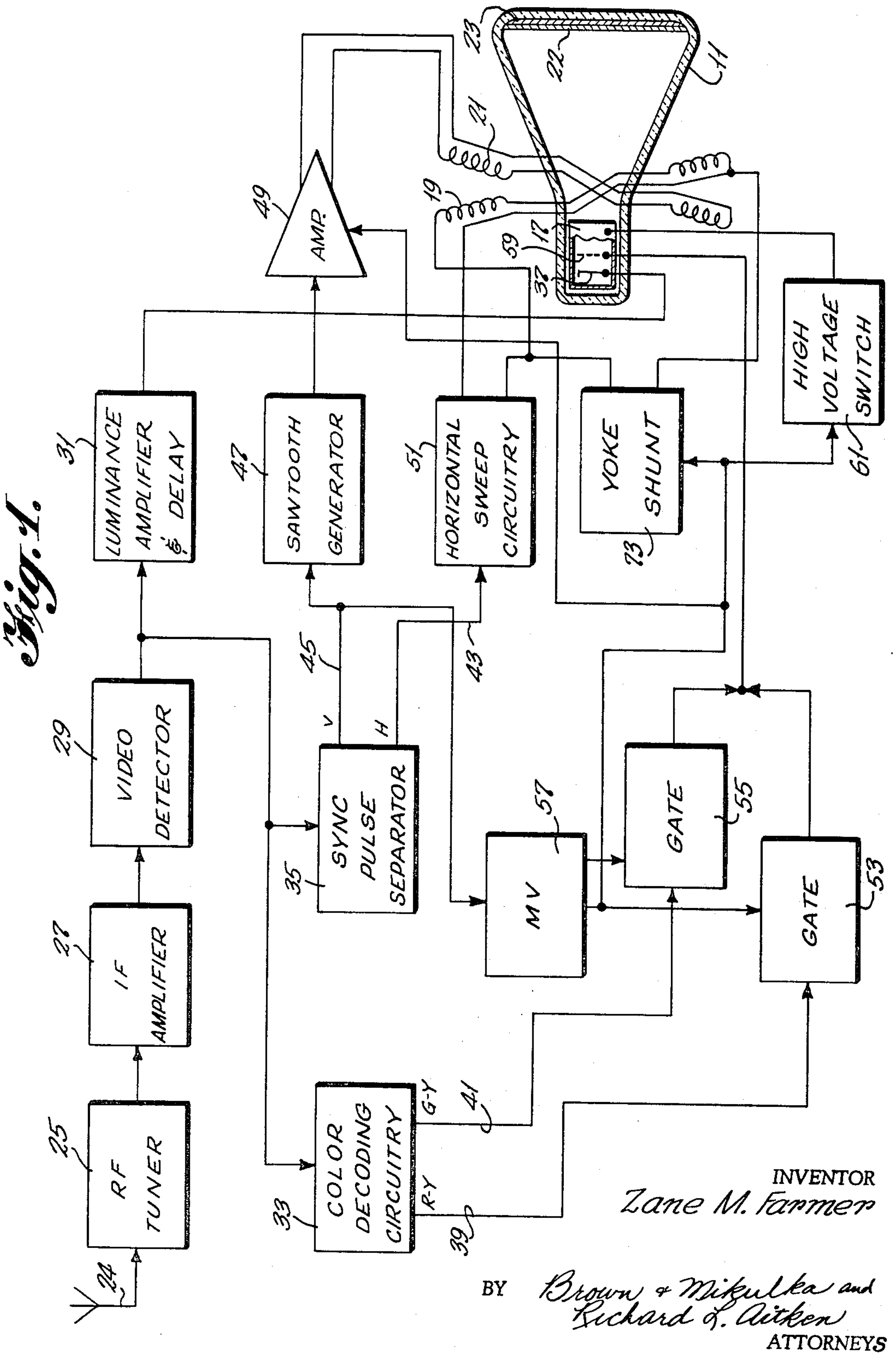
FIG. 1 is a block diagram schematically illustrating a television receiver in accordance with the present invention.

As shown in FIG. 1 the color television receiver of the present invention comprises a color television kinescope or picture tube 11. A simple electron gun 17 is provided in the neck of the picture tube. A horizontal deflection coil 19 is provided to control the deflection of the electron beam produced by the electron gun in the horizontal direction and a vertical deflection coil 21 is provided to control the deflection of the electron beam in the vertical direction. Two luminescent layers 22 and 23 are formed on the inside surface of the screen of the picture tube. The inner layer 22, which is the layer nearer the electron gun, is a luminescent phosphor which gives off red light when excited by an impinging electron. The outer layer 23 is a luminescent phosphor which gives off mixed green and blue light when excited by an impinging electron.

The electron beam produced by the electron gun 17 is accelerated either to a velocity corresponding to 10 kilovolts or to a velocity corresponding to 15 kilovolts. When the electron beam is accelerated to a velocity corresponding to 10 kilovolts it will penetrate only into the inner layer 22 so that only the inner layer is excited and gives off red light. When the electron beam is accelerated to a velocity corresponding to 15 kilovolts, the electrons will have enough energy to penetrate through the inner layer 22 and into the outer layer 23 so that both the layers 22 and 23 are excited and give off their characteristic light. Accordingly, white light will be emitted from the screen when the electron beam is accelerated to the velocity corresponding to 15 kilovolts.

The system of FIG. 1 is a field sequential system so that the electron beam is first caused to scan the entire field on the screen with the velocity corresponding to 10 kilovolts and then is caused to scan the entire field with the velocity corresponding to 15 kilovolts. The intensity of the electron beam is controlled in accordance with the red video in the detected color television signal when the electron beam velocity corresponds to 10 kilovolts and is controlled in accordance with the green video when the electron beam velocity corresponds to 15 kilovolts. Accordingly, images will be produced on the screen in red light in accordance with the red video and images will be produced on the screen in white light in accordance with the green video. The red and white images will be produced alternately on the screen in successive scannings of the field by the electron beam. The alternate red and white images will combine to be perceived as a multicolored image by the viewer.

As shown in FIG. 1 an antenna 24 in the color television receiver of the present invention intercepts the RF color television signal and applies it to an RF tuner 25. The RF color television signal includes an RF picture wave which is amplitude modulated with the composite color video signal, including a luminance signal and a color subcarrier amplitude and phase modulated with the color information, in accordance with the present broadcasting standards. The RF signal also includes sound information, which is detected in a conventional manner, but which will not be described in the present application for purposes of simplification. The RF tuner converts the intercepted RF color television signal to IF and applies it to an IF amplifier 27, which amplifies the applied signal and applies it to a video detector 29. The video detector 29 converts the applied IF signal to the composite color video signal and applies the composite color video signal to a luminance amplifier and delay circuit 31, to color decoding circuitry 33, and to a sync pulse separator 35. The luminance amplifier and delay circuit 31 amplifies the applied signal and delays it to compensate for delays in the processing of the color signals and applies the resulting signal to the cathode 37 of the electron gun 17.

The color decoding circuitry 33, in response to the composite color video signal from the video detector 29, produces an R—Y video signal on a channel 39 and a G—Y video signal on a channel 41. The R—Y signal is the red video minus the luminance or brightness and the G—Y signal is the green video minus the luminance or brightness.

The sync pulse separator 35 separates out the horizontal sync pulses from the applied composite signal and produces them on a channel 43 and separates out the vertical sync pulses from the applied composite signal and produces them on a channel 45. The vertical sync pulses produced on channel 45 are applied to a sawtooth generator 47 which produces a sawtooth voltage waveform at the frequency of the applied vertical sync pulses. The output waveform of the sawtooth generator 47 is amplified by an amplifier 49, the output of which is connected to drive vertical deflection coil 21 and which applies a sawtooth current to the vertical deflection coil 21. The horizontal sync pulses produced on channel 43 are applied to horizontal sweep circuitry 51, the output of which is connected to drive the horizontal deflection coil 19 and which applies a sawtooth current to the horizontal deflection coil 19 in synchronism with the horizontal sync pulses. As a result, the electron beam will scan a field on the screen of the picture tube in the conventional manner.

The R—Y signal produced on channel 39 is applied to a gate 53 and the G—Y signal produced on channel 41 is applied to gate 55. The vertical sync pulses produced on channel 45 are also applied to a multivibrator 57 and each vertical sync pulse produced on channel 45 causes the multivibrator to switch to its opposite state. In one state the multivibrator 57 enables the gate 53 and in its opposite state the multivibrator 57 enables the gate 55. Since the vertical sync pulses are produced between successive scannings of the field, the gates 53 and 55 will be enabled alternately in successive scannings of the field. The outputs of the gates 53 and 55 are both applied to the control grid 59 of the electron gun 17. While the R—Y signal is applied to the grid 59 it coacts with the luminance signal applied to the cathode 37 to control the intensity of the electron beam in accordance with the red video, and while the G—Y signal is applied to the grid 59 it coacts with the luminance signal applied to the cathode 37 to control the intensity of the electron beam in accordance with the green video. Accordingly, the intensity of the electron beam is controlled alternately in accordance with the red video and the green video in successive scannings of the field by the electron beam.

The signal voltage produced by the multivibrator 57 controlling the gate 53 is a square wave voltage having a frequency of one-half the frequency of the vertical sync pulses. This square wave voltage is applied to a high voltage switch 61, which controls the potential applied to the anode of the electron gun. The anode of the electron gun is electrically connected within the tube to an electrically conducting coating on the inner surface of the envelope of the picture tube. The potential applied to the anode of the electron gun will control the velocity of the electrons in the electron beam. The square wave voltage produced by the multivibrator 57, when applied to the high voltage switch 61, causes the high voltage switch 61 to alternately apply 15 kilovolts and 10 kilovolts to the anode of the electron gun. The 10 and 15 kilovolts will be switched in synchronism with the applied square wave and these potentials will be applied in alternate scannings of the field by the electron beam. The 10 kilovolts are applied to the anode of the electron gun when the R—Y signal is applied to the control grid 69 and the 15 kilovolts are applied to the anode of the electron gun when the G–Y signal is applied to the grid 59. The 10 kilovolts applied to the anode of the electron gun will cause the electrons to strike the screen with a velocity sufficient to penetrate only into the inner luminescent layer 22, so that only the inner luminescent layer 22 is excited. Accordingly, only the inner luminescent layer 22 will be excited by the electron beam when the R—Y signal is applied to the grid 59. Thus, while the R—Y signal is applied to the grid 59 the image represented by the red video will be reproduced on the screen in red light. The 15 kilovolts applied by the high voltage switch 61 to the anode of the electron gun will cause the electrons in the electron beam to strike the screen with a velocity to penetrate through the inner luminescent layer 22 into the outer luminescent layer 23, so that both the inner and outer luminescent layers 22 and 23 are excited. Accordingly, both the layers 22 and 23 will be excited and will give off light while the G—Y video signal is applied to the control grid 59 and thus the image represented by the green video will be reproduced on the screen in white light while the G—Y signal is applied to the grid 59. Thus, red and white images are alternately produced on the screen and the red and white images correspond to the red and green video. The red and white images produced alternately on the screen will be perceived by the viewer as a multicolored representation of the transmitted picture.

In order for the red and white images to combine properly to be perceived as the multicolored representation of the transmitted picture, the red and white images must register. However, the deflection field applied to the electron beam by the deflection coils 19 and 21 will tend to deflect the lower velocity electrons to a greater degree than the higher velocity electrons. This difference in deflection would cause one of the images to be larger than the other and the images accordingly would not register. To prevent this misregistration, the square wave produced by the multivibrator 57 and applied to the gate 53 is also applied to the amplifier 49 and to a yoke shunt circuit 73.

Figure 2:
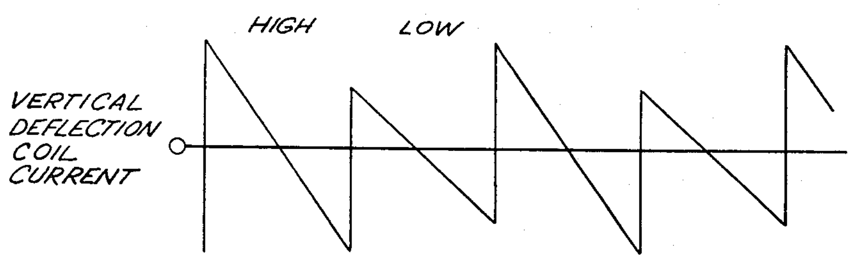
FIG. 2 illustrates the current waveform that is produced in the vertical deflection coil of the picture tube in the receiver of FIG. 1.

The square wave applied to the amplifier 49 operates to reduce the gain of the amplifier 49 while the gate 53 is enabled. As a result, the amplitude of the sawtooth waveform produced in the vertical deflection coil 21 will be reduced while the gate 53 is enabled. The resulting current waveform produced in the coil 21 is illustrated in FIG. 2. The amplitude of the current waveform is alternately relatively high and relatively low in successive cycles of the sawtooth. While the gate 53 is enabled and the R—Y signal is applied to the control grid 59, the amplitude of the sawtooth current waveform produced in the coil 21 will be relatively low, and while the gate 55 is enabled and the G—Y signal is applied to the control grid 59, the amplitude of the sawtooth current waveform produced in the coil 21 will be relatively high. Thus, the deflection field applied to the electron beam by the coil 21 while the electron beam is accelerated to a velocity corresponding to 10 kilovolts will be relatively weak. While the electron beam is accelerated to a velocity corresponding to 15 kilovolts, the deflection field produced by the vertical deflection coil 21 will be relatively strong.

The square wave voltage applied to the yoke shunt circuit 73 by the multivibrator 57 causes the yoke shunt circuit 73 to provide a shunt across the coil 19 while the gate 53 is enabled. This reduces the amplitude of the current waveform applied to the coil 19 while the gate 53 is enabled. Accordingly, the current sawtooth produced in the coil 19 will have a lower amplitude while the R—Y signal is applied to the control grid 59, and will have a relatively higher amplitude while the G—Y signal is applied to the control grid 59. Thus, the deflection field produced by the horizontal deflection coil 19 will be relatively weaker when the electron beam is accelerated to a velocity corresponding to 10 kilovolts, and will be relatively stronger when the electron beam is accelerated to a velocity corresponding to 15 kilovolts.

In this manner, the deflection field generated by both the horizontal and vertical deflection yokes 19 and 21 is made stronger when the electron beam velocity is high, and is made weaker when the electron beam velocity is low. The change in the amplitude of the current waveforms is selected so that the change in the deflection field produced thereby will be such that the high velocity electron beam will scan the same field as the low velocity electron beam. Accordingly, the red and white images produced by the low and high velocity electron beams will register.

Figure 3:
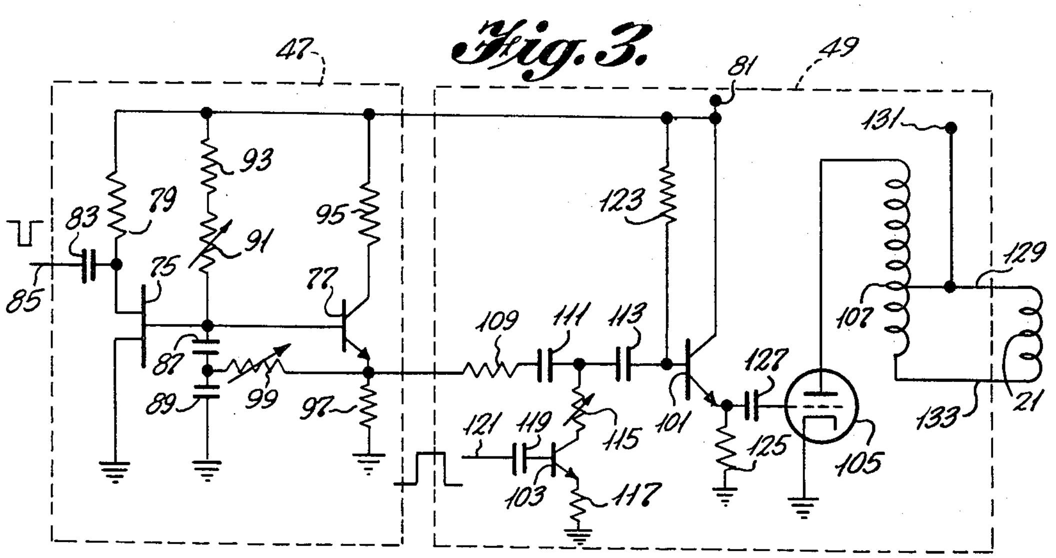
FIG. 3 is a diagram of the circuit for controlling the current applied to the vertical deflection coil.

The circuit shown in FIG. 3 illustrates the details of the sawtooth generator 47 and the amplifier 49. The sawtooth wave generator 47 comprises a unijunction transistor 75 and an NPN transistor 77. The collector of the unijunction transistor 75 is connected to the base of the transistor 77. One base of the unijunction transistor 75 is connected to ground and the other base of the unijunction transistor 75 is connected through a resistor 79 to a source of plus 30 volts applied to a terminal 81. This base of the unijunction transistor 75 is also connected through an isolating capacitor 83 to the input of the sawtooth wave generator, to which the vertical sync pulses are applied. This input is designated in FIG. 3 by the reference number 85. The collector of the unijunction transistor is connected to ground through two capacitors 87 and 89 connected in series and is connected to the plus 30 volts applied at terminal 81 through a variable resistor 91 and a resistor 93 connected in series. The collector of the transistor 77 is connected to the plus 30 volts applied at terminal 81 through a resistor 95, and the emitter of the transistor 77 is connected to ground through a resistor 97. The emitter of the transistor 77 is also connected to the junction between the capacitors 87 and 89 through a variable resistor 99.

The vertical sync pulses applied to the unijunction transistor 75 through the capacitor 83 are negative going, and when applied to the unijunction transistor 75 they render the unijunction transistor 75 conductive so that the capacitor 87 discharges through the unijunction transistor 75 to ground. At the termination of a vertical sync pulse applied to the unijunction transistor, the unijunction transistor 75 will stop conducting, and the capacitor 87 will commence charging from the plus 30 volts applied at terminal 81 through the resistor 93. The charging of the capacitor 87 will then continue until the next vertical sync pulse is applied to the unijunction transistor 75, whereupon the capacitor 87 will discharge to ground and the cycle will be repeated. As a result a sawtooth waveform will be produced at the collector of the unijunction transistor 75. The transistor 77 acts as an emitter follower to transmit the sawtooth waveform to its emitter. The variable resistor 99 connected between the emitter of the transistor 77 and the junction between the capacitors 87 and 89 constitutes a feedback circuit to improve the linearity of the sawtooth.

The amplifier 49 comprises an NPN transistor 101, an NPN transistor 103, a triode 105 and an autotransformer 107. The sawtooth voltage waveform produced at the emitter of the transistor 77 is applied through a series circuit of a resistor 109 and two isolation capacitors 111 and 113 to the base of the transistor 101. The junction between the capacitors 111 and 113 is connected through a variable resistor 115 to the collector of the transistor 103, the emitter of which is connected to ground through a resistor 117. The base of the transistor 103 is connected through an isolation capacitor 119 to an input lead 121, to which the square wave output of the multivibrator 57 is applied. The base of the transistor 101 is connected to the plus 30 volts applied at terminal 81 through a resistor 123. The collector of the transistor 101 is connected directly to the plus 30 volts applied at terminal 81, and the emitter of the transistor 101 is connected to ground through a resistor 125. An isolation capacitor 127 connects the emitter of the transistor 101 to the grid of the triode 105, the cathode of which is grounded and the plate of which is connected to one side of the coil of the autotransformer 107. An output lead 129 tapped from the coil of the autotransformer 107 is connected to a source of plus 140 volts applied at a terminal 131. The amplifier produces its output voltage between the output lead 129 and an output lead 133 connected to the opposite side of the autotransformer coil from the triode. The vertical deflection coil 21 is connected between the output lead 129 and the output lead 133.

The sawtooth waveform produced at the emitter of the transistor 77 is transmitter through the resistor 109 and the capacitors 111 and 113 to the base of the transistor 101, which operates as an emitter follower and reproduces the sawtooth waveform at its emitter. The sawtooth waveform is then applied to the grid of the triode 105 through the isolation capacitor 127. Accordingly, the current flow from the 140 volt source at terminal 131 and through the upper part of the coil of the autotransformer 107 will be controlled in accordance with the sawtooth voltage applied at the grid of the triode 105. The resulting sawtooth current produced in the autotransformer 107 will induce a sawtooth voltage at the output of the autotransformer between conductors 129 and 133. This sawtooth voltage will have a high voltage spike immediately preceding the sloping portion of the sawtooth. This high voltage spike is induced by the rapidly dropping current through the triode 105 in the substantially vertical portions of the current waveform flowing through the triode 105. This high voltage spike commencing each sloping portion of the output waveform of the autotransformer serves to prevent the resulting current waveform applied to the coil 21 from rounding off at the initial portion of the slope.

The square wave voltage applied to the base of the transistor 103 from the multivibrator 57 alternately renders the transistor 103 conductive and nonconductive. The transistor 103 will be rendered conductive whenever the gate 53 is enabled and will be rendered nonconductive whenever the gate 55 is enabled. When the transistor 103 is rendered conductive, the amplitude of the sawtooth wave at the junction between the capacitors 111 and 113 will be attenuated and accordingly the gain of the amplifier will be reduced when the gate 53 is enabled. In this manner the amplitude of the current sawtooth applied to the vertical deflection coil 21 is reduced when the R—Y signal is applied to the control grid 59.

Figure 4:
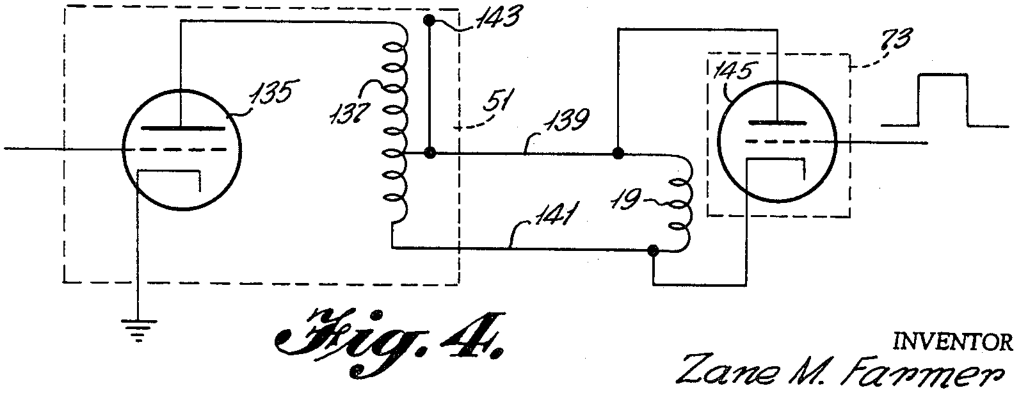
FIG. 4 is a diagram of the circuit for controlling the current flow in the horizontal deflection coil.

The circuit shown in FIG. 4 illustrates the details of the horizontal sweep circuitry 51 and the yoke shunt 73. As shown in FIG. 4, the horizontal sweep circuitry 51 comprises a triode 135 and an autotransformer 137. One end of the autotransformer coil is connected to the plate of the triode 135, the cathode of which is grounded. The horizontal sync pulses are applied to the grid of the triode 135. The output of the transformer 137 is produced between conductors 139 and 141. The conductor 141 is connected to the opposite side of the autotransformer coil from the triode 135. The conductor 139 is tapped from the autotransformer coil and is connected to a source of plus 400 volts applied to a terminal 143. The horizontal deflection coil 19 is connected between the conductors 139 and 141.

The horizontal sync pulses applied to the grid of the triode 135 cause corresponding voltage spikes to be produced between the conductors 139 and 141. These spikes produce a sawtooth current in the horizontal deflection coil 19 as the application of each spike to the coil 19 will cause a sharp rise in the current flow in the coil 19, whereupon the current flow will gradually decay, providing the sloping part of the sawtooth. The yoke shunt 73 comprises a triode 145 having its plate connected to the conductor 139 and its cathode connected to the conductor 141. The square wave produced by the multivibrator 57 is applied to the grid of the triode 145. When the positive going portion of the square wave is applied to the grid of the triode 145, it renders the triode 145 conductive, whereupon the triode 145 draws current and loads down the autotransformer 137 so that the amplitude of the sawtooth current waveform produced in the horizontal deflection coil 19 is reduced. In this manner the horizontal deflection field is weakened when the R—Y signal is applied to the control grid of the picture tube.

Thus there is provided a color television receiver using a picture tube of the penetration type wherein registration of the different color images is achieved by modifying the driving currents in the deflection coils. The gain of the amplifier driving the vertical deflection coil is modified to achieve the desired change in the amplitude of the sawtooth current produced in the vertical deflection coil instead of using a shunt, as is done in the case of the horizontal deflection coil, because of the shape of the voltage waveform that is applied to the deflection coil 21 by the autotransformer 107. A shunt across the coil 21 would not only reduce the amplitude of the current sawtooth produced in the coil 21, but also have an adverse affect on the shape of the current waveform.

The above described specific embodiment of the invention is a field sequential system. However, it will be apparent that the inventive concept is equally applicable to a line sequential system in which the electron beam velocity is switched after the scanning of each line to produce the different colors. In a line sequential system the current in the horizontal and vertical deflection coils would also have to be switched after the scanning of each line to correspond with the change in electron velocity. The present invention is applicable to penetration type television systems designed in accordance with classical or "Newtonian" color theory as well as systems which combine images made up of red and white light to produce a multicolored image to be perceived by the viewer. The present invention is applicable to any type of color television system in which different colors are produced by accelerating the electron beam to different velocities. For example, instead of using a picture tube in which luminescent phosphor layers are formed on the screen of the tube, a picture tube could be used in which the screen is formed of spheroids with the different color-producing phosphors located at different depths within the spheroids. These and many other modifications may be made to the above-described specific embodiment of the invention without departing from the spirit and scope of the invention, which is defined in the appended claims.

What is claimed is:

1. A color television display system comprising a color picture tube having an electron gun for producing an electron beam, horizontal and vertical deflection coils, and a screen which produces different colors when excited by impinging electrons with different velocities; means to cyclically switch the velocity imparted to said electron beam by said electron gun; and sweep circuit means to apply current waveforms to said deflection coils to cause said electron beam to sweep a field on said screen and to cyclically change the amplitude of said current waveforms in synchronism with the switching of the velocity of said electron beam by an amount to compensate for the change in electron beam velocity so as to maintain the field swept by said electron beam the same for different velocities of said electron beam.

2. A color television display system comprising: a color picture tube having an electron gun for producing an electron beam, a screen which produces different colors when excited by impinging electrons with different velocities, and deflection means operable to cause said electron beam to sweep a field on said screen in response to an applied signal excitation, means to cyclically switch the velocity imparted to said electron beam by said electron gun, and means to apply said signal excitation to said deflection means and to cyclically switch the amplitude of said signal excitation in synchronism with the switching of the velocity of said electron beam by an amount to compensate for the change in electron beam velocity so as to maintain the field swept by said electron beam the same for different velocities of said electron beam.

3. A color television display system comprising means to present a composite color video signal, a color picture tube having an electron gun for producing an electron beam, horizontal and vertical deflection coils, and a screen which emits different colored light when excited by impinging electrons with different velocities; means responsive to sync pulses in said composite video signal to switch the velocity imparted to said electron beam by said electron gun in synchronism with said sync pulses, means to apply signals to said electron gun to control the intensity of said electron beam in accordance with the video color information in said composite signal cyclically switching between colors in synchronism with said sync pulses, and sweep circuit means to apply current waveforms to said horizontal and vertical deflection coils to cause said electron beam to sweep a field on said screen and to cyclically change the amplitude of said current waveforms in synchronism with said sync pulses by an amount to compensate for the change in electron beam velocity so as to maintain the field swept by said electron beam the same for different velocities of said electron beam.

4. A color television display system as recited in claim 3 wherein said sync pulses comprise vertical sync pulses.

5. A color television display system comprising means to present a composite video signal, a color picture tube having an electron gun for producing an electron beam, horizontal and vertical deflection coils, and a screen which produces different colors when excited by impinging electrons with different velocities, means to cyclically switch the velocity imparted to said electron beam by said electron gun, means to apply signals to said electron gun to control the intensity of said electron beam in accordance with the video color information in said composite signal cyclically switching between colors in synchronism with the switching of velocity of said electron beam, and sweep circuit means to apply current waveforms to said horizontal and vertical deflection coils to cause said electron beam to sweep a field on said screen and to cyclically change the amplitudes of said current waveforms in synchronism with the switching of the velocity of said electron beam by an amount to compensate for the change in electron beam velocity so as to maintain the field swept by said electron beam the same for different velocities of said electron beam.

6. A color television display system comprising a color picture tube having an electron gun for producing an electron beam, horizontal and vertical deflection coils, and a screen which produces different colors when excited by impinging electrons with different velocities; means to cyclically switch the velocity of said electron beam; and sweep circuit means to apply current waveforms to said deflection coils to cause said electron beam to sweep a field on said screen and to cyclically change the amplitude of said current waveforms in synchronism with the switching of the velocity of said electron beam, said sweep circuit means including an amplifier driving at least one of said coils and means to cyclically change the gain of said amplifier in synchronism with the switching of velocity of said electron beam.

7. A color television display system comprising a color picture tube having an electron gun for producing an electron beam, horizontal and vertical deflection coils, and a screen which produces different colors when excited by impinging electrons with different velocities; means to cyclically switch the velocity of said electron beam; and sweep circuit means to apply current waveforms to said deflection coils to cause said electron beam to sweep a field on said screen and to cyclically change the amplitude of said current waveforms in synchronism with the switching of the velocity of said electron beam, said sweep circuit means including a circuit shunting at least one of said deflection coils, and means cyclically changing the conductivity of said shunting circuit in synchronism with the switching of velocity of said electron beam.

8. A color television display system comprising a color picture tube having an electron gun for producing an electron beam, horizontal and vertical deflection coils, and a screen which produces different colors when excited by impinging electrons with different velocities; means to cyclically switch the velocity of said electron beam; and sweep circuit means to apply current waveforms to said deflection coils to cause said electron beam to sweep a field on said screen and to cyclically change the amplitude of said current waveforms in synchronism with the switching of the velocity of said electron beam, said sweep circuit including an amplifier driving said vertical deflection coil, a circuit shunting said horizontal deflection coil, and means to cyclically change the gain of said amplifier and the conductivity of said shunting circuit in synchronism with the switching of velocity of said electron beam.

9. A color television display system comprising means to present a composite color video signal, a color picture tube having an electron gun for producing an electron beam, horizontal and vertical deflection coils, and a screen which emits different colored light when excited by impinging electrons with different velocities; means responsive to sync pulses in said composite video signal to switch the velocity of said electron beam in synchronism with said sync pulses, means to apply signals to said electron gun to control the intensity of said electron beam in accordance with the video color information in said composite signal cyclically switching between colors in synchronism with said sync pulses, and sweep circuit means to apply current waveforms to said horizontal and vertical deflection coils to cause said electron beam to sweep a field on said screen and to cyclically change the amplitude of said current waveforms in synchronism with said sync pulses, said sweep circuit means including an amplifier driving at least one of said coils and means to cyclically change the gain of said amplifier in synchronism with said sync pulses.

10. A color television display system comprising means to present a composite color video signal, a color picture tube having an electron gun for producing an electron beam, horizontal and vertical deflection coils, and a screen which emits different colored light when excited by impinging electrons with different velocities; means responsive to sync pulses in said composite video signal to switch the velocity of said electron beam in synchronism with said sync pulses, means to apply signals to said electron gun to control the intensity of said electron beam in accordance with the video color information in said composite signal cyclically switching between colors in synchronism with said sync pulses, and sweep circuit means to apply current waveforms to said horizontal and vertical deflection coils to cause said electron beam to sweep a field on said screen and to cyclically change the amplitude of said current waveforms in synchronism with said sync pulses, said sweep circuit means including a circuit shunting at least one of said deflection coils, and means cyclically changing the conductivity of said shunting circuit in synchronism with said sync pulses.

11. A color television display system comprising means to present a composite color video signal, a color picture tube having an electron gun for producing an electron beam, horizontal and vertical deflection coils, and a screen which emits different colored light when excited by impinging electrons with different velocities; means responsive to sync pulses in said composite video signal to switch the velocity of said electron beam in synchronism with said sync pulses, means to apply signals to said electron gun to control the intensity of said electron beam in accordance with the video color information in said composite signal cyclically switching between colors in synchronism with said sync pulses, and sweep circuit means to apply current waveforms to said horizontal and vertical deflection coils to cause said electron beam to sweep a field on said screen and to cyclically change the amplitude of said current waveforms in synchronism with said sync pulses, said sweep circuit means including an amplifier driving said vertical deflection coil, a circuit shunting said horizontal deflection coil, and means to cyclically change the gain of said amplifier and the conductivity of said shunting circuit in synchronism with said sync pulses.

12. A color television display system comprising means to present a composite video signal, a color picture tube having an electron gun for producing an electron beam, horizontal and vertical deflection coils, and a screen which produces different colors when excited by impinging electrons with different velocities, means to cyclically switch the velocity of said electron beam, means to apply signals to said electron gun to control the intensity of said electron beam in accordance with the video color information in said composite signal cyclically switching between colors in synchronism with the switching of velocity of said electron beam, and sweep circuit means to apply current waveforms to said horizontal and vertical deflection coils to cause said electron beam to sweep a field on said screen and to cyclically change the amplitudes of said current waveforms in synchronism with the switching of the velocity of said electron beam, said sweep circuit means including an amplifier driving at least one of said coils and means to cyclically change the gain of said amplifier in synchronism with the switching of velocity of said electron beam.

13. A color television display system comprising means to present a composite video signal, a color picture tube having an electron gun for producing an electron beam, horizontal and vertical deflection coils, and a screen which produces different colors when excited by impinging electrons with different velocities, means to cyclically switch the velocity of said electron beam, means to apply signals to said electron gun to control the intensity of said electron beam in accordance with the video color information in said composite signal cyclically switching between colors in synchronism with the switching of velocity of said electron beam, and sweep circuit means to apply current waveforms to said horizontal and vertical deflection coils to cause said electron beam to sweep a field on said screen and to cyclically change the amplitudes of said current waveforms in synchronism with the switching of the velocity of said electron beam, said sweep circuit means including a circuit shunting at least one of said deflection coils, and means to cyclically change the conductivity of said shunting circuit in synchronism with the switching of velocity of said electron beam.

14. A color television display system comprising means to present a composite video signal, a color picture tube having an electron gun for producing an electron beam, horizontal and vertical deflection coils, and a screen which produces different colors when excited by impinging electrons with different velocities, means to cyclically switch the velocity of said electron beam, means to apply a signal to said electron gun to control the intensity of said electron beam in accordance with the video color information in said composite signal cyclically switching between colors in synchronism with the switching of velocity of said electron beam, and sweep circuit means to apply current waveforms to said horizontal and vertical deflection coils to cause said electron beam to sweep a field on said screen and to cyclically change the amplitudes of said current waveforms in synchronism with the switching of the velocity of said electron beam, said sweep circuit means including an amplifier driving said vertical deflection coil, a circuit shunting said horizontal deflection coil, and means to cyclically change the gain of said amplifier and the conductivity of said shunting circuit in synchronism with the switching of velocity of said electron beam.

References Cited

UNITED STATES PATENTS 3,114,795 12/1963 Moles ______________ 178—5.4
3,188,508 6/1965 Thomas _________ 315—13 XR
3,335,220 8/1967 Wilcox.

ROBERT L. GRIFFIN, *Primary Examiner.*

RICHARD MURRAY, *Assistant Examiner.*